United States Patent
Iwakura et al.

(10) Patent No.: US 11,836,580 B2
(45) Date of Patent: Dec. 5, 2023

(54) MACHINE LEARNING METHOD

(71) Applicant: FUJITSU LIMITED, Kawasaki (JP)

(72) Inventors: Satoko Iwakura, Kawasaki (JP); Shunichi Watanabe, Kawasaki (JP); Tetsuyoshi Shiota, Yokohama (JP); Izumi Nitta, Kawasaki (JP); Daisuke Fukuda, Setagaya (JP); Masaru Todoriki, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 691 days.

(21) Appl. No.: 16/697,179

(22) Filed: Nov. 27, 2019

(65) Prior Publication Data

US 2020/0193327 A1 Jun. 18, 2020

(30) Foreign Application Priority Data

Dec. 18, 2018 (JP) ................. 2018-236435

(51) Int. Cl.
*G06N 20/00* (2019.01)
*G06Q 10/1091* (2023.01)
*G06F 16/901* (2019.01)

(52) U.S. Cl.
CPC ......... *G06N 20/00* (2019.01); *G06F 16/9024* (2019.01); *G06Q 10/1091* (2013.01)

(58) Field of Classification Search
CPC ........ G06N 20/00; G06N 3/084; G06N 3/105; G06F 16/9024; G06F 16/2237; G06F 7/023; G06Q 10/1091; H04L 41/16; H04N 21/251; H04N 21/466; H04N 21/45; H04N 21/4662
See application file for complete search history.

(56) References Cited

U.S. PATENT DOCUMENTS

| | | | | |
|---|---|---|---|---|
| 10,210,860 | B1 * | 2/2019 | Ward | G10L 25/18 |
| 10,248,908 | B2 * | 4/2019 | Temam | G06N 3/063 |
| 10,467,504 | B1 * | 11/2019 | Hamedi | G06K 9/6201 |
| 10,489,462 | B1 * | 11/2019 | Rogynskyy | G06N 7/02 |
| 10,789,544 | B2 * | 9/2020 | Fiedel | G06N 20/00 |

(Continued)

FOREIGN PATENT DOCUMENTS

JP 08-329196 A 12/1996

OTHER PUBLICATIONS

U.S. Appl. No. 62/714/586 (Specification), filed Aug. 3, 2018. Inventor: Noam M. Shazeer. (Year: 2018).*

*Primary Examiner* — Michael Won
(74) *Attorney, Agent, or Firm* — XSENSUS LLP

(57) ABSTRACT

A machine learning method includes acquiring data including attendance records of employees and information indicating which employee has taken a leave of absence from work, in response to determining that a first employee of the employees has not taken a leave of absence in accordance with the data, generating a first tensor on a basis of an attendance record of the first employee and parameters associated with elements included in the attendance record, in response to determining that a second employee of the employees has taken a leave of absence in accordance with the data, modifying the parameters, and generating a second tensor on a basis of an attendance record of the second employee and the modified parameters, and generating a model by machine learning based on the first tensor and the second tensor.

10 Claims, 19 Drawing Sheets

(56) References Cited

U.S. PATENT DOCUMENTS

| | | | |
|---|---|---|---|
| 10,915,663 B1* | 2/2021 | Ferrer | G06V 40/172 |
| 10,922,604 B2* | 2/2021 | Zhao | G06N 3/084 |
| 11,075,933 B1* | 7/2021 | Fetters | H04W 12/64 |
| 11,494,740 B1* | 11/2022 | Buscaglia | G06Q 10/1091 |
| 2001/0032119 A1* | 10/2001 | Bode | G06Q 10/109 |
| | | | 705/7.42 |
| 2013/0204598 A1* | 8/2013 | Mallet | G01V 1/325 |
| | | | 703/6 |
| 2013/0339919 A1* | 12/2013 | Baseman | G05B 19/41875 |
| | | | 716/136 |
| 2018/0260683 A1* | 9/2018 | Gulland | G06N 3/063 |
| 2018/0293506 A1* | 10/2018 | Lee | G06N 20/00 |
| 2018/0349477 A1* | 12/2018 | Jaech | G06F 16/3334 |
| 2019/0108493 A1* | 4/2019 | Nelson | G06Q 10/1095 |
| 2019/0130268 A1* | 5/2019 | Shiring | G06N 3/0481 |
| 2019/0318225 A1* | 10/2019 | Heinecke | G06F 8/4442 |
| 2019/0324606 A1* | 10/2019 | Kveton | G06F 3/0483 |
| 2020/0042875 A1* | 2/2020 | Shazeer | G06F 16/9024 |
| 2020/0074270 A1* | 3/2020 | Zadrozny | G01V 99/005 |
| 2020/0081804 A1* | 3/2020 | Sridhara | G06F 11/2069 |
| 2020/0082264 A1* | 3/2020 | Guo | G06N 3/04 |
| 2020/0117446 A1* | 4/2020 | Smith | G06F 8/36 |
| 2020/0133817 A1* | 4/2020 | Schornack | G06F 11/3476 |
| 2020/0160535 A1* | 5/2020 | Ali Akbarian | G06N 5/02 |
| 2020/0175095 A1* | 6/2020 | Morariu | G06N 5/046 |
| 2020/0193273 A1* | 6/2020 | Chung | G06F 9/54 |
| 2021/0019626 A1* | 1/2021 | Shazeer | G06N 3/04 |
| 2021/0176262 A1* | 6/2021 | Harris | G06Q 20/4016 |
| 2021/0374936 A1* | 12/2021 | Koopman | G06T 7/0004 |

* cited by examiner

FIG.2

(a) LEARNED AS MEDICALLY TREATED CASE ("UNWELL PERSON"), ATTACHED WITH LABEL (MEDICALLY TREATED)

| MONTH | 4 | 5 | 6 | 7 | 8 | 9 | 10 | 11 | 12 | PRESENT ← PAST |
|---|---|---|---|---|---|---|---|---|---|---|
| ATTENDANCE STATUS | | | | | | | | | | |

LEAVE LEAVE LEAVE LEAVE    MEDICAL TREATMENT (b) LEARNED AS NO MEDICAL TREATMENT CASE ("NORMAL PERSON"), ATTACHED WITH LABEL (NO MEDICAL TREATMENT)

| MONTH | 4 | 5 | 6 | 7 | 8 | 9 | 10 | 11 | 12 | PRESENT ← PAST |
|---|---|---|---|---|---|---|---|---|---|---|
| ATTENDANCE STATUS | | | | | | | | | | |

LEAVE    LEAVE    LEAVE

FIG.7

| TYPE | SETTING VALUE (WEIGHT) |
|---|---|
| TREATMENT-EXPERIENCED PERSON IN PERIOD AFTER MEDICAL TREATMENT | 0.5 |
| OTHER THAN THE ABOVE | 1.0 |

FIG.8

| EMPLOYEE'S NO. | DATE | DAY OF WEEK | ATTEN-DANCE STATUS | ATTEN-DANCE TIME | LEAVING TIME | OVER-TIME HOUR | BUSINESS TRIP |
|---|---|---|---|---|---|---|---|
| 100 | 20150401 | WEDNESDAY | LEAVE | | | | |
| 100 | 20150402 | THURSDAY | ATTEN-DANCE | 08:49 | 0:00 | 360 | NOT MADE |
| 100 | 20150403 | FRIDAY | ATTEN-DANCE | 08:49 | 0:00 | 360 | NOT MADE |
| 100 | 20150404 | SATURDAY | ATTEN-DANCE | 09:00 | 17:00 | 420 | NOT MADE |
| ... | | | | | | | |
| 100 | 20150823 | TUESDAY | ATTEN-DANCE | 08:49 | 17:50 | 0 | NOT MADE |
| 100 | 20150824 | WEDNESDAY | MEDICAL TREATMENT | | | | |
| ... | | | | | | | |
| 100 | 20151004 | TUESDAY | MEDICAL TREATMENT | | | | |
| 100 | 20151002 | WEDNESDAY | ATTEN-DANCE | 08:30 | 17:50 | 0 | NOT MADE |
| 100 | 20151003 | THURSDAY | ATTEN-DANCE | 08:30 | 17:50 | 0 | NOT MADE |
| ... | ... | | | | | | |

FIG.9

| EMPLOYEE | DATA (EXPLANATORY VARIABLE) | LABEL (OBJECTIVE VARIABLE) |
|---|---|---|
| EMPLOYEE A | ATTENDANCE BOOK DATA FROM JANUARY TO JUNE | NO MEDICAL TREATMENT |
| | ATTENDANCE BOOK DATA FROM FEBRUARY TO JULY | NO MEDICAL TREATMENT |
| | ATTENDANCE BOOK DATA FROM MARCH TO AUGUST | MEDICALLY TREATED |
| | ... | ... |
| EMPLOYEE B | ... | ... |
| ... | ... | ... |

FIG.10

| EMPLOYEE'S NO. | DATE | DAY OF WEEK | ATTEN-DANCE STATUS | ATTEN-DANCE TIME | LEAVING TIME | OVERTIME HOUR | BUSINESS TRIP | VALUE (WEIGHT) | |
|---|---|---|---|---|---|---|---|---|---|
| 100 | 20150401 | WEDNESDAY | LEAVE | | | | | 1 | ⎫ PERIOD BEFORE MEDICAL TREATMENT |
| 100 | 20150402 | THURSDAY | ATTEN-DANCE | 08:49 | 0:00 | 360 | NOT MADE | 1 | |
| 100 | 20150403 | FRIDAY | ATTEN-DANCE | 08:49 | 0:00 | 360 | NOT MADE | 1 | |
| 100 | 20150404 | SATURDAY | ATTEN-DANCE | 09:00 | 17:00 | 420 | NOT MADE | 1 | |
| ⋮ | | | | | | | | ⋮ | |
| 100 | 20150823 | TUESDAY | ATTEN-DANCE | 08:49 | 17:50 | 0 | NOT MADE | 1 | |
| 100 | 20150824 | WEDNESDAY | MEDICAL TREATMENT | | | | | −(MEDICAL TREATMENT PERIOD) | ⎫ MEDICAL TREATMENT PERIOD |
| 100 | ⋮ | | | | | | | −(MEDICAL TREATMENT PERIOD) | |
| 100 | 20151004 | TUESDAY | MEDICAL TREATMENT | | | | | −(MEDICAL TREATMENT PERIOD) | |
| 100 | 20151002 | WEDNESDAY | ATTEN-DANCE | 08:30 | 17:50 | 0 | NOT MADE | 1→0.5 | ⎫ PERIOD AFTER MEDICAL TREATMENT |
| 100 | 20151003 | THURSDAY | ATTEN-DANCE | 08:30 | 17:50 | 0 | NOT MADE | 1→0.5 | |
| ⋮ | | | | | | | | | |

CHANGE WEIGHT (applies to VALUE (WEIGHT) column)

FIG.13
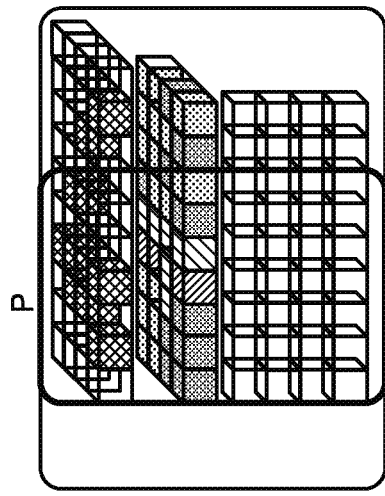
EMPLOYEE A
(LABEL: MEDICALLY TREATED)
(UNWELL PERSON)
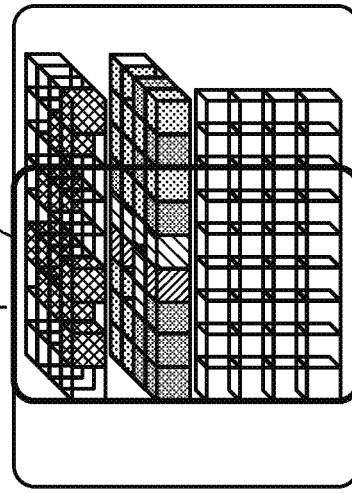
EMPLOYEE B
(LABEL: NO MEDICAL TREATMENT)
(TREATMENT-EXPERIENCED PERSON IN
PERIOD AFTER MEDICAL TREATMENT)
FEATURES ARE NOT DISTINGUISHED
FROM EACH OTHER BECAUSE OF
THE SAME TENSOR
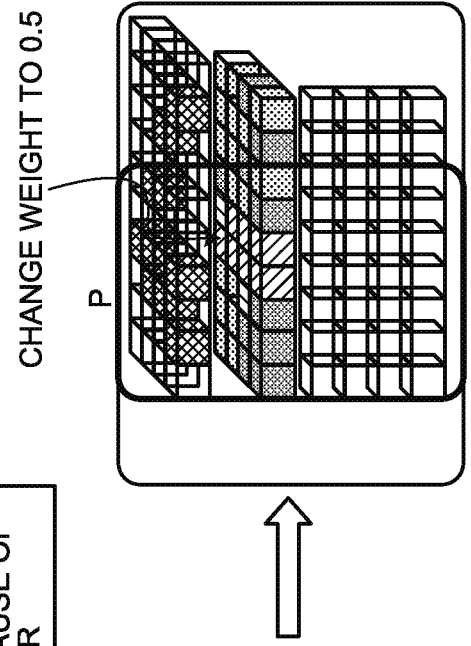
CHANGE WEIGHT TO 0.5

FIG.14
EMPLOYEE A
| DATA ID | MONTH | DATE | ATTENDANCE STATUS | BUSINESS-TRIP STATUS | VALUE (WEIGHT) |
|---|---|---|---|---|---|
| EMPLOYEE A | 4 | 10 | ATTENDANCE | MADE | 1 |
| EMPLOYEE A | 4 | 11 | ATTENDANCE | NOT MADE | 1 |
| EMPLOYEE A | 4 | 12 | ANNUAL LEAVE | NOT MADE | 1 |
| EMPLOYEE A | 4 | 13 | ATTENDANCE | NOT MADE | 1 |
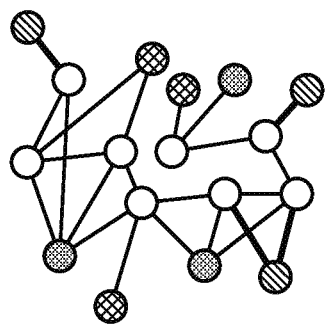
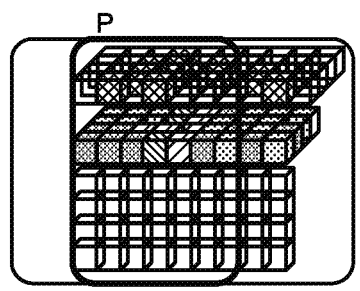

MACHINE LEARNING METHOD

CROSS-REFERENCE TO RELATED APPLICATION

This application is based upon and claims the benefit of priority of the prior Japanese Patent Application No. 2018-236435, filed on Dec. 18, 2018, the entire contents of which are incorporated herein by reference.

FIELD

The embodiments discussed herein are related to machine learning technology.

BACKGROUND

Graph structure learning techniques (hereinafter one configuration of devices performing the graph structure learning is called a "deep tensor (DT)") have been known that can perform deep learning on graph structured data. The DT uses the graph structure as input and handles the graph structure as tensor data (hereinafter described as a tensor in some cases). The DT extracts a partial structure of a graph (a partial pattern of a tensor) contributing to prediction as a core tensor to achieve highly accurate prediction.

An example of conventional techniques is disclosed in Japanese Laid-open Patent Publication No. 08-329196.

SUMMARY

According to an aspect of an embodiment, a machine learning method includes acquiring data including attendance records of employees and information indicating which employee has taken a leave of absence from work, in response to determining that a first employee of the employees has not taken a leave of absence in accordance with the data, generating a first tensor on a basis of an attendance record of the first employee and parameters associated with elements included in the attendance record, in response to determining that a second employee of the employees has taken a leave of absence in accordance with the data, modifying the parameters, and generating a second tensor on a basis of an attendance record of the second employee and the modified parameters, and generating a model by machine learning based on the first tensor and the second tensor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram explaining an example of learning data;

FIG. 7 is a diagram illustrating an example of weight information stored in the weight information DB;

FIG. 8 is a diagram illustrating an example of information stored in an attendance book data DB;

FIG. 9 is a diagram illustrating an example of information stored in a learning data DB;

FIG. 10 is a diagram explaining determination of a medical treatment period and setting of weights;

FIG. 13 is a diagram explaining weight change on the tensor data about a treatment-experienced person;

FIG. 14 is a diagram explaining learning data excluded from weight change;

DESCRIPTION OF EMBODIMENTS

The DT can process a partially common pattern by the core tensor. However, data that is partially similar to the common pattern on the basis of the partial tensor but, in fact, has a different feature as a whole is processed as the common pattern in some cases. As a result, prediction accuracy is reduced.

For example, when attendance book data is learned by the DT, the attendance book data about an unwell person and the attendance book data about a well person are input to the DT to learn a prediction model. The attendance book data about a person subjected to determination is input to the learned prediction model to predict possibility of the person receiving medical treatment (taking administrative leave).

In such learning, the attendance book data about a treatment-experienced person, who has a past experience of receiving medical treatment due to developing of mental illness, for example, has fluctuation such as frequent leave or frequent tardiness in some cases even when the person works as normal after been reinstated. In such a case, the attendance book data may be similar to the attendance book data that has fluctuation in attendance, which is a sign before newly receiving medical treatment, on a partial tensor in some cases. The medical treatment, however, does not always occur after the fluctuation in attendance. The attendance book data about the treatment-experienced person serves as noise, thereby reducing prediction accuracy of a person who will newly receive medical treatment.

Preferred embodiments will be explained with reference to accompanying drawings. The following embodiments do not limit the invention. The respective embodiments can be combined as appropriate within a consistent range.

Physical condition management of employees has recently been ranked as an important matter that companies address. Companies predict mental disorders of their employees in a coming few months from attendance book data about the employees and early take actions such as counseling. In general, full-time stuffs read the attendance book data about a huge number of employees and search employees matching a working condition having distinctive patterns such as frequent business trip, long time overtime work, continuous absence, unauthorized absence, and combinations thereof in a visual manner. Such distinctive patterns are difficult to be clearly defined because the full-time stuffs have different standards.

In this embodiment, a prediction model that predicts metal disorders of employees is learned as an example of deep learning using a deep tensor. In the learning, the attendance book data about employees is the object to be learned and the attendance book data about an unwell person and the attendance book data about a well person are input to the deep tensor to predict the prediction model.

Figure 1:
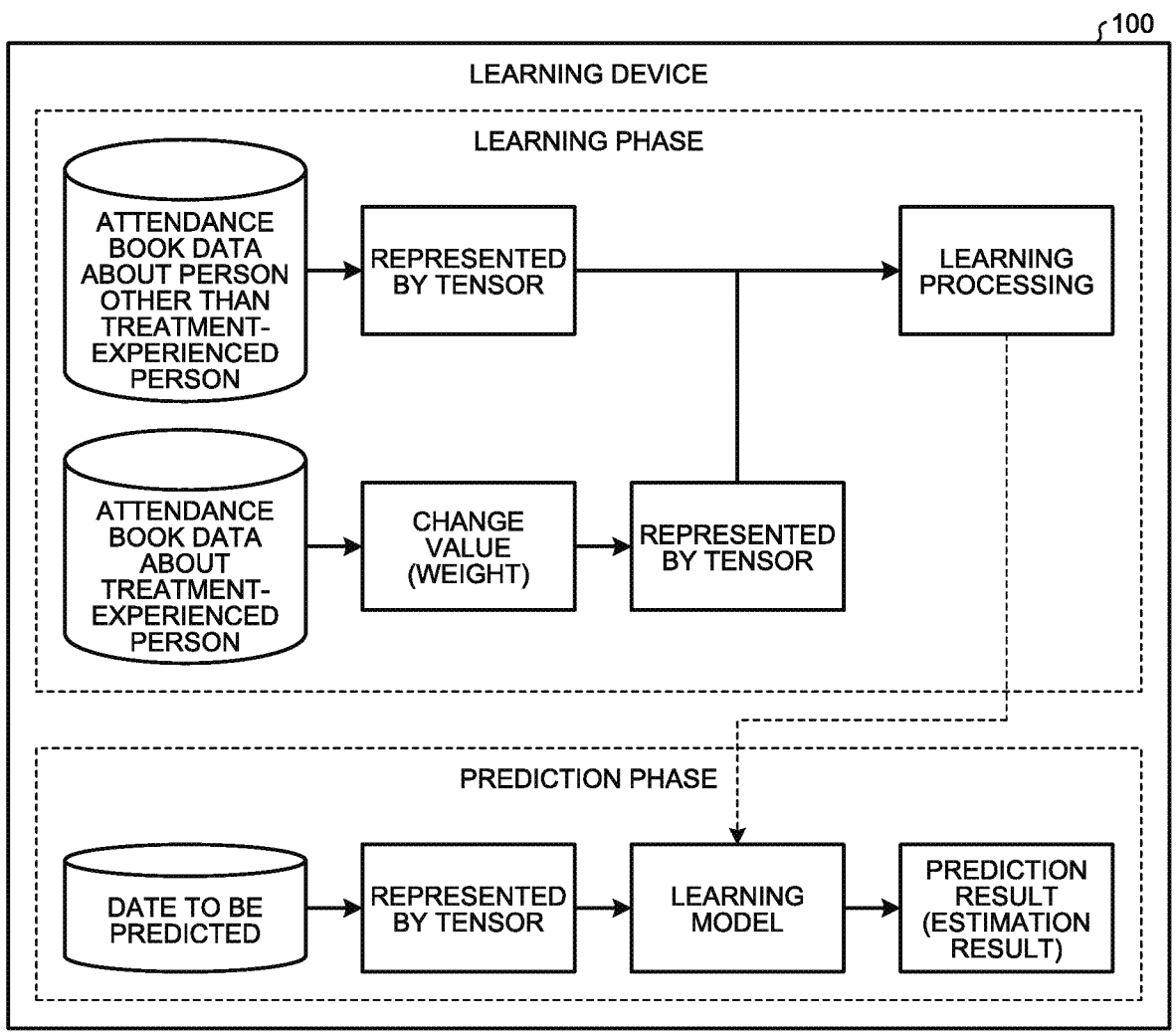
FIG. 1 is a diagram explaining an overview example of machine learning according to a first embodiment.

FIG. 1 is a diagram illustrating an overview example of machine learning according to a first embodiment. As illustrated in FIG. 1, a learning device 100 according to the first embodiment performs machine learning on attendance book data including working situations such as daily attendance time and leaving time, leave acquisition, and business trips of employees to produce a prediction model. The learning device 100 is an example of a computer device that predicts whether an employee will receive medical treatment (take administrative leave) from the attendance book data about a certain employee serving as the prediction object using the learned prediction model. In this example, the learning device 100 performs learning processing and prediction processing. The learning processing and the prediction processing can be performed by separate devices.

The learning device 100 stores therein learning data including the attendance book data that is about an employee and includes a plurality of elements and employee information (label) that identifies whether the employee is an unwell person who has an experience of receiving medical treatment or a well person who receives no medical treatment. The learning device 100 stores therein a target core tensor and a weighting rule for the attendance book data about a treatment-experienced person that indicates an employee who has a past experience of receiving medical treatment and has been reinstated.

The learning device 100 produces a tensor from the attendance book data to be represented by a tensor without changing a weight (e.g., the weight is left unchanged as 1) for the attendance book data as for the learning data that does not fall under the treatment-experienced person. The learning device 100 performs tensor decomposition on tensor data represented by a tensor to produce a core tensor so as to be similar to the target core tensor. Thereafter, the learning device 100 inputs the core tensor to a learner using the deep tensor to perform supervised learning.

As for the learning data that falls under the treatment-experienced person, the learning device 100 changes the weight for any element included in the attendance book data to be represented by a tensor in accordance with the preliminarily stored weighting rule to change the tensor data. The learning device 100 performs the tensor decomposition on the data after the weight change to produce the core tensor so as to be similar to the target core tensor. Thereafter, the learning device 100 inputs the core tensor to the learner using the deep tensor to perform supervised learning.

The following describes the learning data input to the deep tensor. FIG. 2 is a diagram explaining a example of the learning data. The learning data includes the attendance book data for six months and a label that indicates whether the employee received medical treatment within three months after the six months. FIG. 2(a) is the attendance book data about an unwell person and a label (medically treated) is attached to the attendance book data. FIG. 2(b) is the attendance book data about a well person and a label (no medical treatment) indicating that no medical treatment was received is attached to the attendance book data. As illustrated in FIG. 2, the learning device 100 according to the first embodiment learns a prediction model using "the attendance book data for six months attached with the label (medically treated)" and "the attendance book data for six months attached with the label (no medical treatment)" as the learning data. The learning device 100 predicts, after the learning, whether a certain person will receive medical treatment within three months from the attendance book data about the person for six months. In FIG. 2, the shaded section indicates leave.

The following describes the deep tensor. The deep tensor performs deep learning using a tensor (graph information) as input. The deep tensor automatically extracts a partial graph structure contributing to the determination while learning a neural network. The extraction processing is achieved by learning parameters of the tensor decomposition of the input tensor data while learning the neural network.

Figure 3:
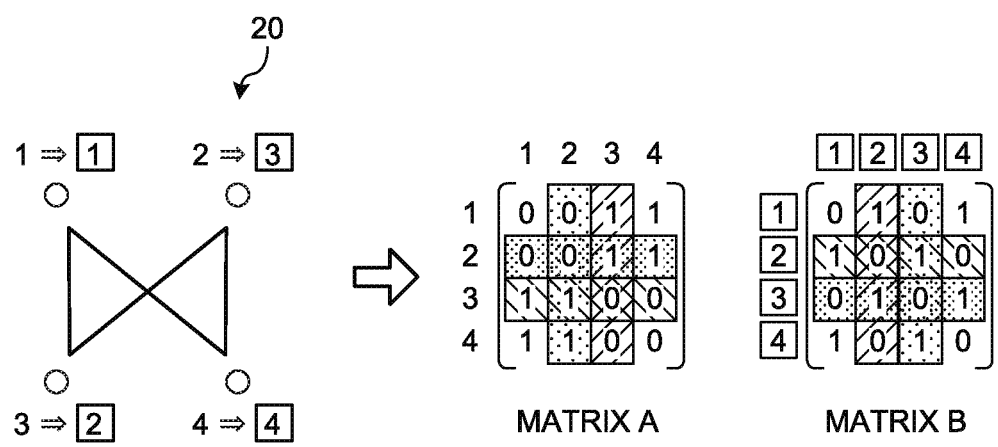
FIG. 3 is a diagram illustrating an example of a relation between a graph structure and a tensor.
Figure 4:
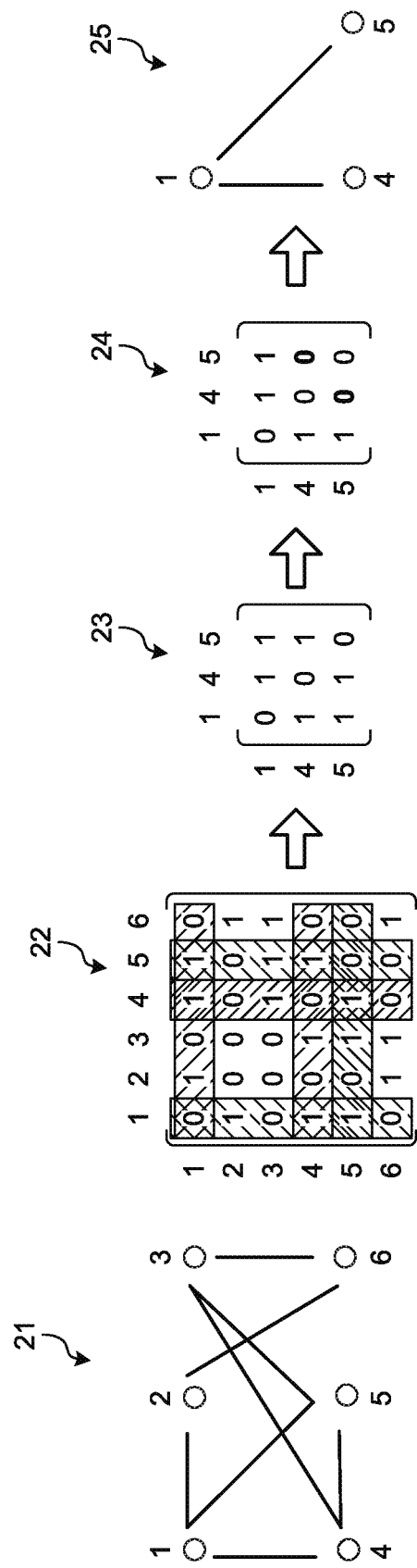
FIG. 4 is a diagram illustrating an example of extraction of a partial graph structure.

The following describes a graph structure with reference to FIGS. 3 and 4. FIG. 3 is a diagram illustrating an example of a relation between the graph structure and the tensor. In a graph 20 illustrated in FIG. 3, four nodes are linked by edges each indicating an inter-node relation (e.g., a "correlation coefficient is equal to or larger than a certain value"). The nodes not being linked by the edge have no relation therebetween. When the graph 20 is represented by a second rank tensor, i.e., by a matrix, the matrix expression based on the numbers on the left side of the respective nodes is represented by a "matrix A" while the matrix expression based on the numbers (each enclosed by an enclosure line) on the right side of the respective nodes is represented by a "matrix B". Each component of the matrices is represented as "1" when the nodes are linked (connected) while each component is represented as "0" when the nodes are not linked (connected). In the following description, such a matrix is described as an incident matrix. The "matrix B" can be produced by concurrently substituting the second and the third rows as well as the second and the third columns of the "matrix A". The deep tensor performs processing using such substitution while ignoring a difference in order. In the deep tensor, the ordering of the "matrix A" and the "matrix B" is ignored and the matrices are handled as the same graph. The processing is the same as that for a tensor of the third or more rank.

FIG. 4 is a diagram illustrating an example of extraction of the partial graph structure. In a graph 21 illustrated in FIG. 4, six nodes are linked by the edges. The graph 21 can be represented as a matrix 22 by a matrix (tensor) representation. A partial graph structure can be extracted by combination of computing to interchange particular rows and columns, computing to extract particular rows and columns, and computing to substitute the non-zero components in the incident matrix with zero to the matrix 22. For example, a matrix corresponding to "nodes 1, 4, and 5" of the matrix 22 is extracted, whereby a matrix 23 is obtained. Then, the values between the "nodes 4 and 5" of the matrix 23 are substituted with zero, whereby a matrix 24 is obtained. The partial graph structure corresponding to the matrix 24 is obtained as a graph 25.

Such extraction processing of the partial graph structure can be achieved by mathematical computing called tensor decomposition. The tensor decomposition is computing to approximate an input nth-rank tensor with a product of the tensors of the nth-rank or below. For example, the input nth-rank tensor is approximated with a product of an nth-rank tensor (called a core tensor) and the n number of tensors of the rank lower than the nth-rank (in a case where n>2, the second rank tensor, i.e., a matrix is usually used). The decomposition is non-unique. Any partial graph structure in the graph structure presented by the input data can be included in the core tensor.

The attendance book data can be formed as graph data composed of a plurality of nodes and a plurality of edges connecting the nodes. The multiple nodes are composed of date nodes, month nodes, and attendance status nodes. The date, month, and attendance status nodes are present corresponding to the numbers of dates, months, and types of attendance status, respectively. The respective nodes each have a number corresponding to one of the dates, months, and types of attendance status. For example, when the date is "1", the value is set to "1", when the attendance status is "absence", the value is set to "2", and when the attendance status is "attendance", the value is set to "1". The edge connects the related nodes among the date, month, and attendance status nodes.

Figure 5:
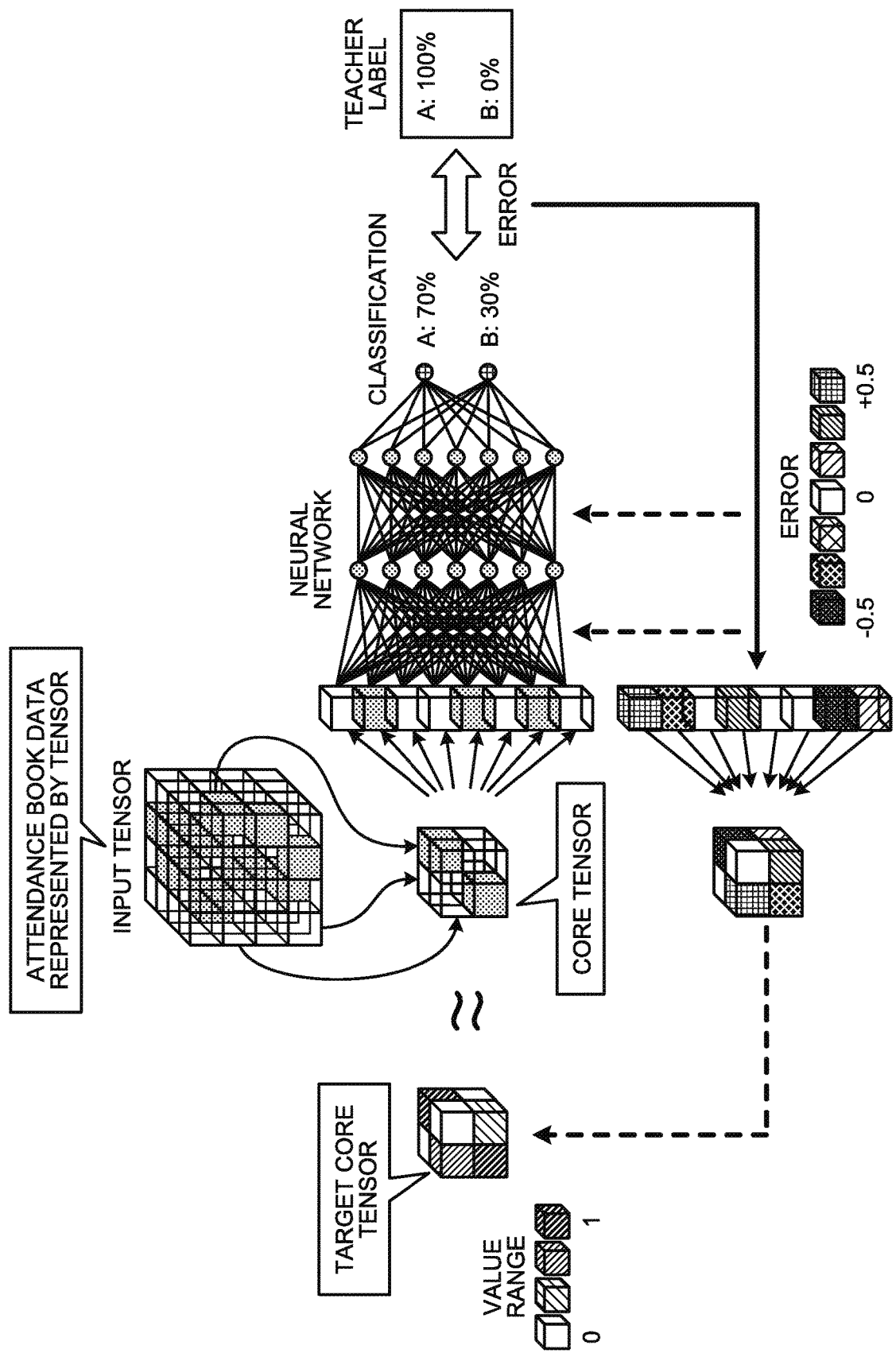
FIG. 5 is a diagram explaining an example of learning in a deep tensor.

The following describes learning in the deep tensor. FIG. 5 is a diagram explaining an example of learning in the deep tensor. As illustrated in FIG. 5, the learning device 100 produces an input tensor from the attendance book data attached with a teacher label (label A) indicating that the employee had received medical treatment, for example. The learning device 100 performs the tensor decomposition on the input tensor to produce a core tensor so as to be similar to the target core tensor randomly produced initially. The learning device 100 inputs the core tensor to a neural network (NN) to obtain a classification result (label A: 70%, label B: 30%). Thereafter, the learning device 100 calculates a classification error between the classification result (label A: 70%, label B: 30%) and the teacher label (label A: 100%, label B: 0%).

The learning device 100 learns a prediction model and a method of tensor decomposition using extended backpropagation, which is an extended method of backpropagation. The learning device 100 corrects various parameters in the NN so as to reduce the classification error by propagating the classification error in an input layer, an intermediate layer, and an output layer included in the NN such that the error is propagated toward lower layers. The learning device 100 propagates the classification error to the target core tensor to correct the target core tensor so as to be close to the partial graph structure contributing to prediction, i.e., a feature pattern indicating a feature of the unwell person or a feature pattern indicating a feature of the well person.

In the prediction after the learning, the input tensor is converted into the core tensor (partial pattern of the input tensor) so as to be similar to the target core tensor by the tensor decomposition, and the core tensor is input to the neural network, resulting in a prediction result being obtained.

When performing the learning using the tensors produced from the attendance book data about the well person and the attendance book data about the unwell person, the learning device 100 refers to the whole period of the attendance book data regardless of whether medical treatment is included in a period (e.g., six months+three months for label use) extracted as one piece of the learning data, and identifies the person who has a past experience of receiving medical treatment (treatment-experienced person). The learning device 100 reduces the weight for the tensor of data in a period after medical treatment (after reinstatement) of the treatment-experienced person, the data having a risk of partially being similar to the fluctuated pattern in the attendance book, the pattern being a sign before receiving medical treatment, when producing the core tensor (extracting the partial pattern).

This allows the learning device 100 to extract the treatment-experienced person and the unwell person (person who will newly receive medical treatment) as different core tensors when the attendance book data about the treatment-experienced person is partially similar to the attendance book data about the unwell person before newly receiving medical treatment, such as frequent absent and tardiness in the attendance book data. The learning device 100, thus, can correctly lean the feature of the unwell person, thereby making it possible to prevent deterioration in prediction accuracy of the person who will newly receive medical treatment.

Figure 6:
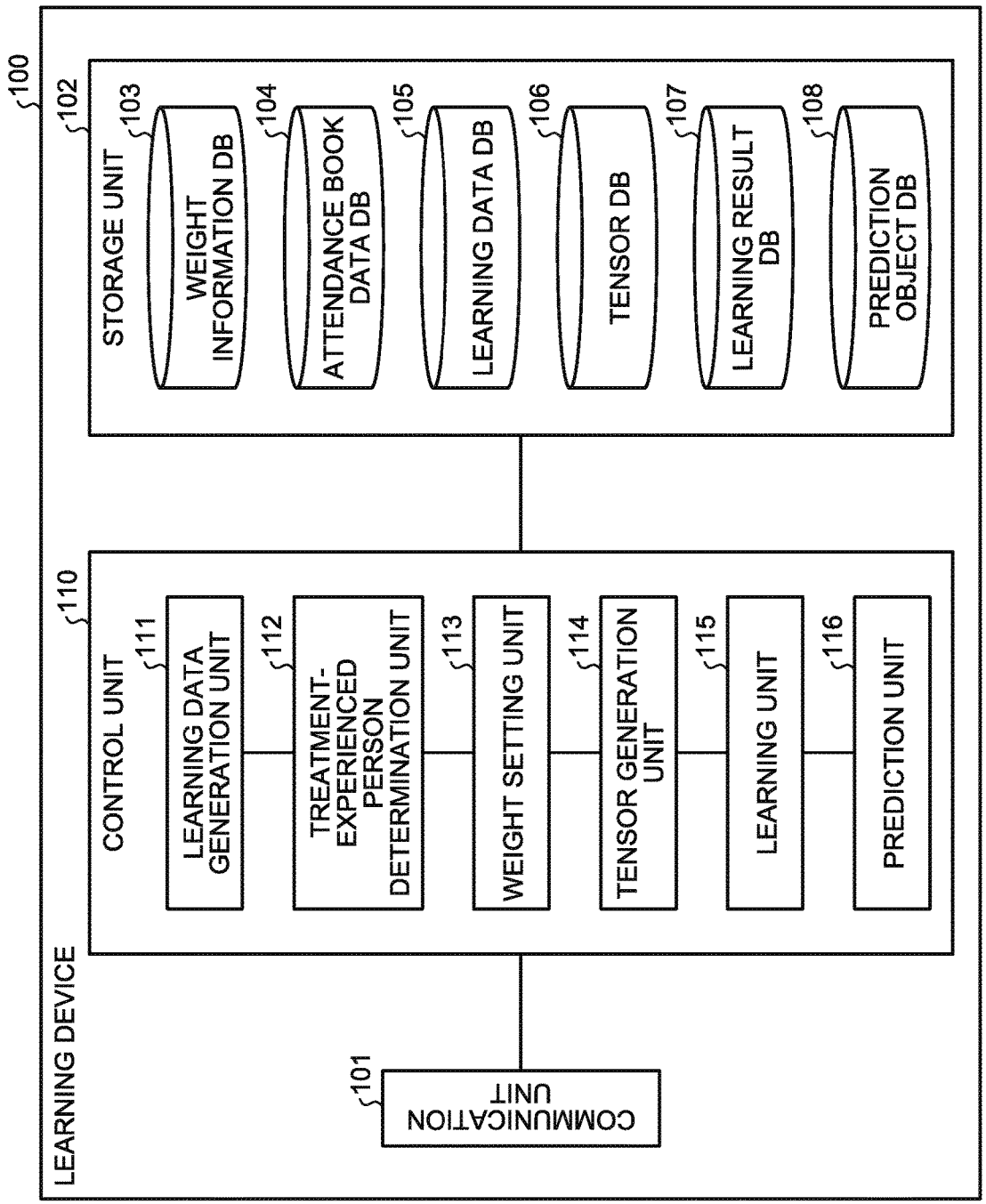
FIG. 6 is a functional block diagram illustrating a functional structure of a learning device according to the first embodiment.

FIG. 6 is a functional block diagram illustrating a functional structure of the learning device 100 according to the first embodiment. As illustrated in FIG. 6, the learning device 100 includes a communication unit 101, a storage unit 102, and a control unit 110.

The communication unit 101 is a processing unit that controls communication with other devices. The communication unit 101 is a communication interface, for example. The communication unit 101 receives, from an administrator's terminal, a processing start instruction, learning data, and an input tensor produced from the learning data by being represented by a tensor, for example. The communication unit 101 outputs a learning result and a prediction result to the administrator's terminal.

The storage unit 102 is an example of the storage device that stores therein programs and data. The storage unit 102 is a memory or a hard disk drive, for example. The storage unit 102 stores therein a weight information DB 103, an attendance book data DB 104, a learning data DB 105, a tensor DB 106, a learning result DB 107, and a prediction object DB 108.

The weight information DB 103 is a database that stores therein a weighting rule indicating weight setting contents set to the tensor data. FIG. 7 is a diagram illustrating an example of weight information stored in the weight information DB 103. As illustrated in FIG. 7, the weight information DB 103 stores therein "types" and "setting values (weights)" in association with each other. The "type" stored therein indicates a data type while the "setting value (weight)" stored therein indicates the value to be set.

In the example in FIG. 7, the weight for the tensor data of the treatment-experienced person after medical treatment period is set to "0.5" while the weighting for the tensor data other than that data is set to "1.0". The weight "1.0" can be interpreted that the tensor data is not changed, thereby making it possible to use a default value, for example. The weight "0.5" can be interpreted that a part of the weight for the tensor data is changed so as to reduce importance, thereby making it possible to use a value smaller than the default value. The weight can also be set for each of elements such as the month and the attendance status.

The attendance book data DB 104 is a database that stores therein the attendance book data about the attendances of the employees, for example. The attendance book data stored therein is obtained by making the attendance books used in respective companies into data. The attendance book data can be acquired from known various attendance management systems, for example. FIG. 8 is a diagram illustrating an example of the information stored in the attendance book data DB 104. As illustrated in FIG. 8, the attendance book data is stored such that "an employee's number, a date, a day of week, attendance status, an attendance time, a leaving time, an overtime hour, and a business trip" are in association with one another. In the attendance status, types such as attendance, medical treatment, and leave are stored. The date and the day of week are the examples of the elements included in the attendance book data.

The example in FIG. 8 illustrates the attendance book data about an employee having an employee's number 100. For example, the second row in FIG. 8 is the attendance book data on "Thursday, Apr. 2, 2015". The data is an example where the employee came to the office at "8:49" and left the office at "0:00", worked overtime for "360 minutes", and did not make a business trip. The seventh row in FIG. 8 is the attendance book data on "Wednesday, Aug. 24, 2015". The data indicates that the employee had received medical treatment from that day until "Tuesday, Oct. 4, 2015". The attendance book data is not limited to be on a day basis, and may be on a week or a month basis.

The learning data DB 105 is a database that stores therein learning data serving as the object to be represented by a tensor. Specifically, the learning data DB 105 stores therein pieces of learning data each of which is a set of data extracted from the attendance book data in a period of six months and the label.

For example, the attendance book data for six months is extracted as one piece of learning data. The label "medically treated" is set when a medical treatment period in which the employee received medical treatment is present in three months after the six months while the label "no medical treatment" is set when no medical treatment period is present in three months after the six months. When the medical treatment period is included in the attendance book data for six months, the attendance book data is not used as the learning data. Because, at the predicting time, it is clear that the person who is already recorded as "medical treatment" in the attendance book data for six months, which serves as prediction origin data (input), received treatment quite recently. The person is thus excluded from the object of medical treatment prediction for coming three months.

FIG. 9 is a diagram illustrating an example of the information stored in the learning data DB 105. As illustrated in FIG. 9, the learning data DB 105 stores therein "the employee, the data (explanatory variable), and the label (objective variable)" in association with one another. The "employee" stored therein is the employee corresponding to the attendance book data serving as the production origin of the learning data. The learning data including the data (explanatory variable) and the label (objective variable) is stored.

In the example in FIG. 9, the label "no medical treatment" is set to the attendance book data about employee A from January to June and to the attendance book data about employee A from February to July. The label "medically treated" is set to the attendance book data about employee A from March to August.

The tensor DB 106 is a database that stores therein respective tensors (tensor data) produced from the pieces of learning data about the respective employees. The tensor DB 106 stores therein tensor data in which each tensor and the label are in association with each other. For example, the tensor DB 106 stores therein "tensor No. 1, and the label (no medical treatment)" and "tensor No. 2, and the label (medically treated)" as "the data No., and the label". Each tensor stored therein may be produced by another device other than the learning device 100 or can be produced by the learning device 100.

The learning result DB 107 is a database that stores therein learning results. For example, the learning result DB 107 stores therein the determination results (classification results) of the learning data by the control unit 110, and various parameters of the NN and various parameters of the deep tensor learned by the machine learning and the deep learning.

The prediction object DB 108 is a database that stores therein the attendance book data about an object to be predicted whether the object will newly receive medical treatment using the learned prediction model. For example, the prediction object DB 108 stores therein the attendance book data serving as the prediction object, or the tensor produced from the attendance book data serving as the prediction object.

The control unit 110 is a processing unit that manages the whole processing of the learning device 100. The control unit 110 is a processor, for example. The control unit 110 includes a learning data generation unit 111, a treatment-experienced person determination unit 112, a weight setting unit 113, a tensor generation unit 114, a learning unit 115, and a prediction unit 116. The learning data generation unit 111, the treatment-experienced person determination unit 112, the weight setting unit 113, the tensor generation unit 114, the learning unit 115, and the prediction unit 116 are examples of the processes that an electronic circuit included in the processor or the processor performs.

The learning data generation unit 111 is a processing unit that produces the learning data composed of sets of pieces of data for certain periods with different starting times and labels corresponding to the staring times from the respective pieces of attendance book data stored in the attendance book data DB 104. Specifically, the learning data generation unit 111 samples pieces of data for a designated period from the attendance book data about a person allowing duplication. The learning data generation unit 111 extracts a plurality of pieces of data having different beginnings of periods (starting times) from the respective pieces of attendance book data. The learning data generation unit 111 sets the label "medically treated" when the medical treatment period is present in three months from the end time of the data. The learning data generation unit 111 sets the label "no medical treatment" when no medical treatment period is present in three months from the end time of the data, for each piece of data. Thereafter, the learning data generation unit 111 stores the learning data in which the extracted pieces of data and the set labels are in association with each other in the learning data DB 105.

For example, the learning data generation unit 111 extracts the attendance book data from January to June from the attendance book data from January to December. The learning data generation unit 111 attaches the label "no medical treatment" to the extracted attendance book data when no medical treatment period is present in the three months from July to September to produce the learning data. Then, the learning data generation unit 111 extracts the attendance book data from February to July from the attendance book data from January to December. The learning data generation unit 111 attaches the label "medically treated" to the extracted attendance book data when the medical treatment period is present in the three months from August to October to produce the learning data.

The treatment-experienced person determination unit 112 is a processing unit that determines whether the employee to be determined is the treatment-experienced person on the basis of the attendance book data serving as the origin of the respective pieces of learning data. For example, the treatment-experienced person determination unit 112 refers to the attendance book data for the whole data period, which differs from "six moment" used for prediction, of the employee, determines that the employee to be the treatment-experienced person when the "medical treatment period" was present in the past, and determines that the employee is a well person when no "medical treatment period" was present in the past. The treatment-experienced person determination unit 112 notifies the weight setting unit 113 of the determination results of the respective pieces of learning data.

The treatment-experienced person the employee who has a medical treatment period in the whole attendance book data in the past, i.e., the period is not limited only a period used for one piece of learning data. For example, when the treatment period was present in two years ago from the learning time, a case occurs where the person is not the "unwell person" but falls under the "treatment-experienced person" on the basis of only the data for recent six months in some cases.

The weight setting unit 113 is a processing unit that determines whether each learning data falls under a period after the medical treatment of the treatment-experienced person, and changes a part of the weights for the tensor data in accordance with the determination result. Specifically, the weight setting unit 113 sets the weights for each learning data stored in the learning data DB 105 in accordance with the weighting rule stored in the weight information DB 103. The weight setting unit 113 outputs the setting result of the weights to the tensor generation unit 114.

For example, the weight setting unit 113 sets the weight to "0.5" for the learning data produced from the attendance book data that is about the employee determined to be the treatment-experienced person by the treatment-experienced person determination unit 112 and falls under the period after the medical treatment period. The weight setting unit 113 sets the weight to "1.0" for each learning data other than the learning data corresponding to "the treatment-experienced person in a period after medical treatment". The weight setting unit 113 sets the weight for the learning data about the treatment-experienced person, which is an example of a certain condition, so as to reduce importance of the data falling under a period after the medical treatment period of the employee who has reinstated.

The following describes the medical treatment period and the setting of the weight with reference to FIG. 10. FIG. 10 is a diagram explaining the determination of the medical treatment period and the weight setting. As illustrated in FIG. 10, the weight setting unit 113 determines whether each learning data corresponds to any of before and after the "medical treatment period" in prior to each data is represented by a tensor. In the example in FIG. 10, the weight setting unit 113 detects the "medical treatment period" from "Aug. 24, 2015" to "Oct. 4, 2015", then sets the weight to "1.0" for the learning data falling under before "Aug. 24, 2015", at which the medical treatment started, and sets the weight to "0.5" for the learning data falling under after "Oct. 4, 2015", at which the medical treatment ended.

It is determined that the period before the medical treatment period, which is described as a period before medical treatment, is important to extract it as the core tensor (a partial pattern influencing the prediction), which is a partial pattern serving as a factor of receiving medical treatment factor. The weight is, thus, set to "1". In contrast, it is determined that the period after the medical treatment period, which is described as a period after medical treatment, is not important to extract it as the core tensor, which is a partial pattern serving as a factor of receiving medical treatment. The weight is, thus, set to "0.5". As described above, a part of the weights for the tensor data is changed for the learning data falling under the after medical treatment period of the treatment-experienced person.

The tensor generation unit 114 is a processing unit that represents each learning data as a tensor. Specifically, the tensor generation unit 114 produces tensors composed of elements included in the respective pieces of learning data which are stored in the learning data DB 105 and to which the weight setting unit 113 completes the weight setting, and stores them in the tensor DB 106. For example, the tensor generation unit 114 produces the fourth rank tensor composed of four elements included in each learning data and stores it in the tensor DB 106. The tensor generation unit 114 stores the tensor and the label "medically treated" or "no medical treatment" attached to the learning data in association with each other.

Specifically, the tensor generation unit 114 produces the tensor from the learning data using each attribute assumed to characterize a tendency of receiving medical treatment as each dimension. For example, the tensor generation unit 114 produces the fourth rank tensor having the fourth dimension using four elements of the month, the date, the attendance status, and business trip status. When the data is for six months, the number of elements of the month is "6", the number of elements of the date is "31" because the maximum value of the number of days in each month is 31, the number of elements of the attendance status is "3" when the types of attendance status are attendance, leave, and holiday, and the number of elements of the business trip status is "2" because the status is either the business trip was made or not made. The tensor produced from the learning data is, thus, "6×31×3×2" tensor. The value of element corresponding to the attendance status and the business trip status for each date in each month is 1 while the value of element other than those is 0.

Figure 11:
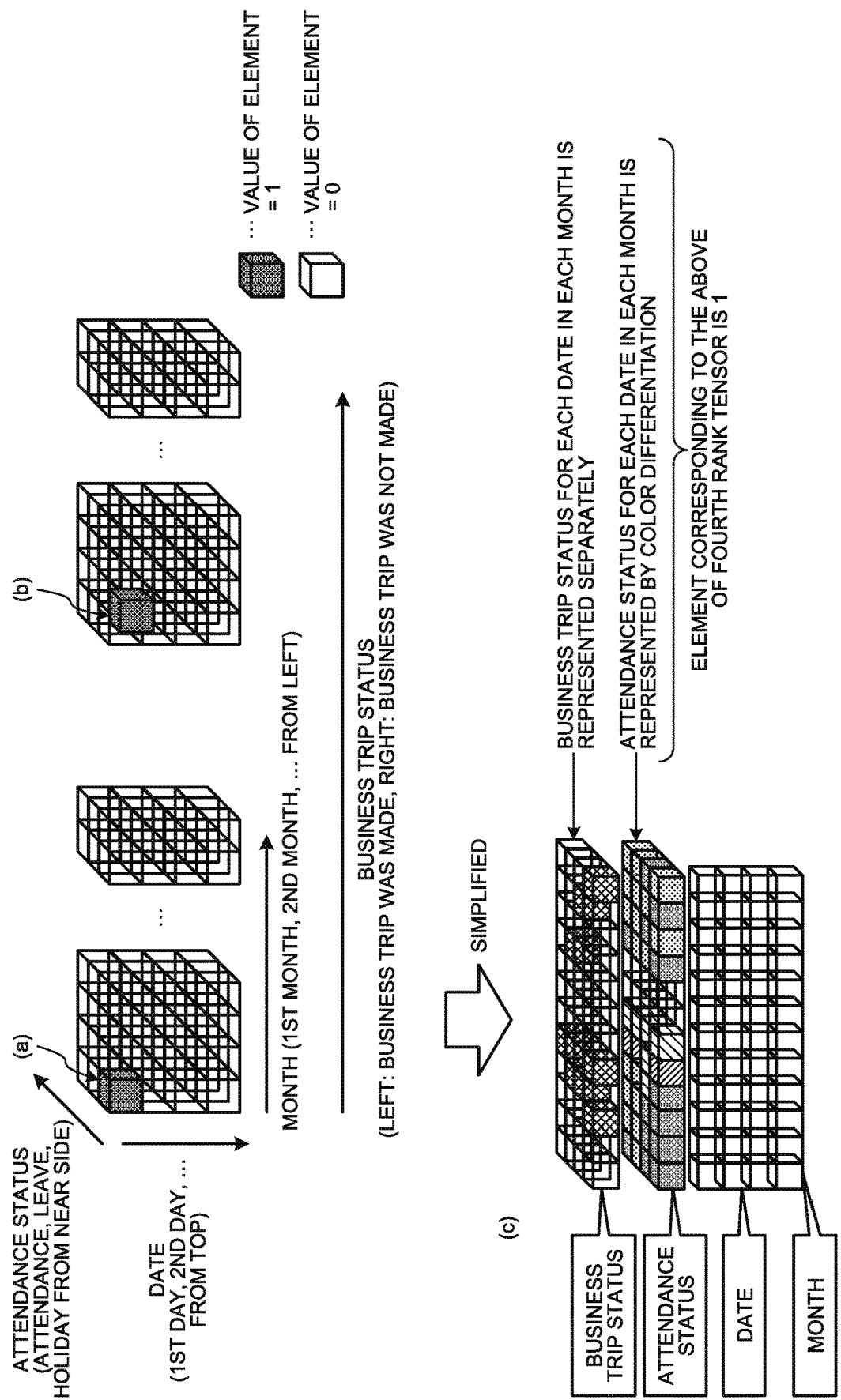
FIG. 11 is a diagram explaining a tensor representation.

FIG. 11 is a diagram explaining a tensor representation. As illustrated in FIG. 11, the tensor produced by the tensor generation unit 114 is composed of data about the month in the horizontal direction, the date in the vertical direction, the attendance status in the depth direction, that business trip was made on the left side, and that business trip was not made on the right side. The dates are indicated sequentially from the first day on the top. In the attendance status, attendance, leave, and holiday are indicated from the near side. For example, FIG. 11(a) illustrates the element corresponding to the condition where the employee worked on the first day of the first month and made a business trip. FIG. 11(b) illustrates the element corresponding to the condition where the employee took leave on the second day of the first month and did not make a business trip.

In the embodiment, the tensor described above is simplified to be described as illustrated in FIG. 11(c). The tensor is represented in a cube shape composed of layered respective elements of the month, the date, the attendance status, and the business trip status. The business trip status for each date in each moth is represented separately. The attendance status for each date in each month is represented separately.

The learning unit 115 is a processing unit that learns a prediction model by the deep tensor using each tensor produced from each learning data and the label, and a method of the tensor decomposition. Specifically, the learning unit 115 performs learning utilizing a characteristic of the deep tensor. The deep tensor has the characteristic of "being capable of recognizing a partial structure of the graph (tensor)". For example, the learning unit 115 extracts the core tensor from the tensor serving as the input object (input tensor), inputs the core tensor to the NN, and calculates an error (classification error) between the classification result from the NN and the label attached to the input tensor, in the same manner as the method described with reference to FIG. 5. The learning unit 115 learns parameters of the NN and optimizes the target core tensor using the classification error. Thereafter, the learning unit 115 stores the various parameters in the learning result DB 107 as the learning results when the learning ends.

In the tensor decomposition described in the first embodiment, the core tensor is calculated so as to be similar to the target core tensor to dispose the important structure for classification at the similar position in the core tensor. The leaning is performed on the NN using the core tensor, thereby achieving highly accurate classification.

The prediction unit 116 is a processing unit that predicts a label of the data to be determined using the learning result. Specifically, the prediction unit 116 reads various parameters from the learning result DB 107 and establishes a neural network in which the various parameters are set. The prediction unit 116 reads the attendance book data to be predicted from the prediction object DB 108 and produces the tensor to be input to the neural network from the attendance book data to be predicted in the same method as the learning.

Thereafter, the prediction unit 116 acquires, from the learned neural network (prediction model), a prediction result of whether the employee will receive medical treatment. The prediction unit 116 displays the prediction result on a display or transmits the prediction result to the administrator's terminal.

The prediction unit 116 refers to the attendance book data about the employee to be predicted to determine whether the medical treatment period is included in the period before the attendance book data period for prediction. When the employee is the well person because the medical treatment period is not included, the prediction unit 116 can perform prediction. When the employee is the treatment-experienced person because the medical treatment period is included, the prediction unit 116 can output an alarm.

Figure 12:
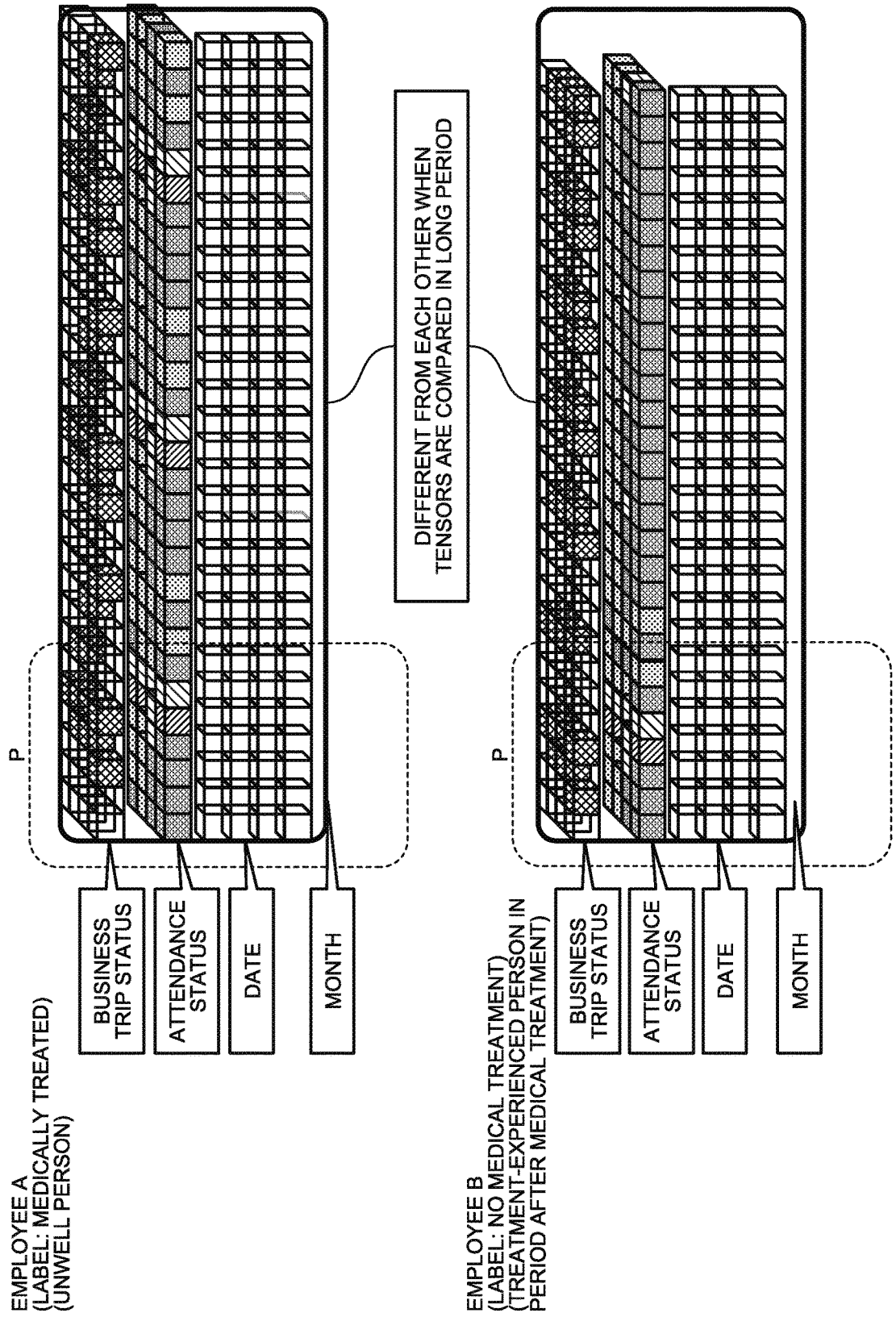
FIG. 12 is a diagram illustrating an example of comparison of pieces of tensor data.
Figure 15:
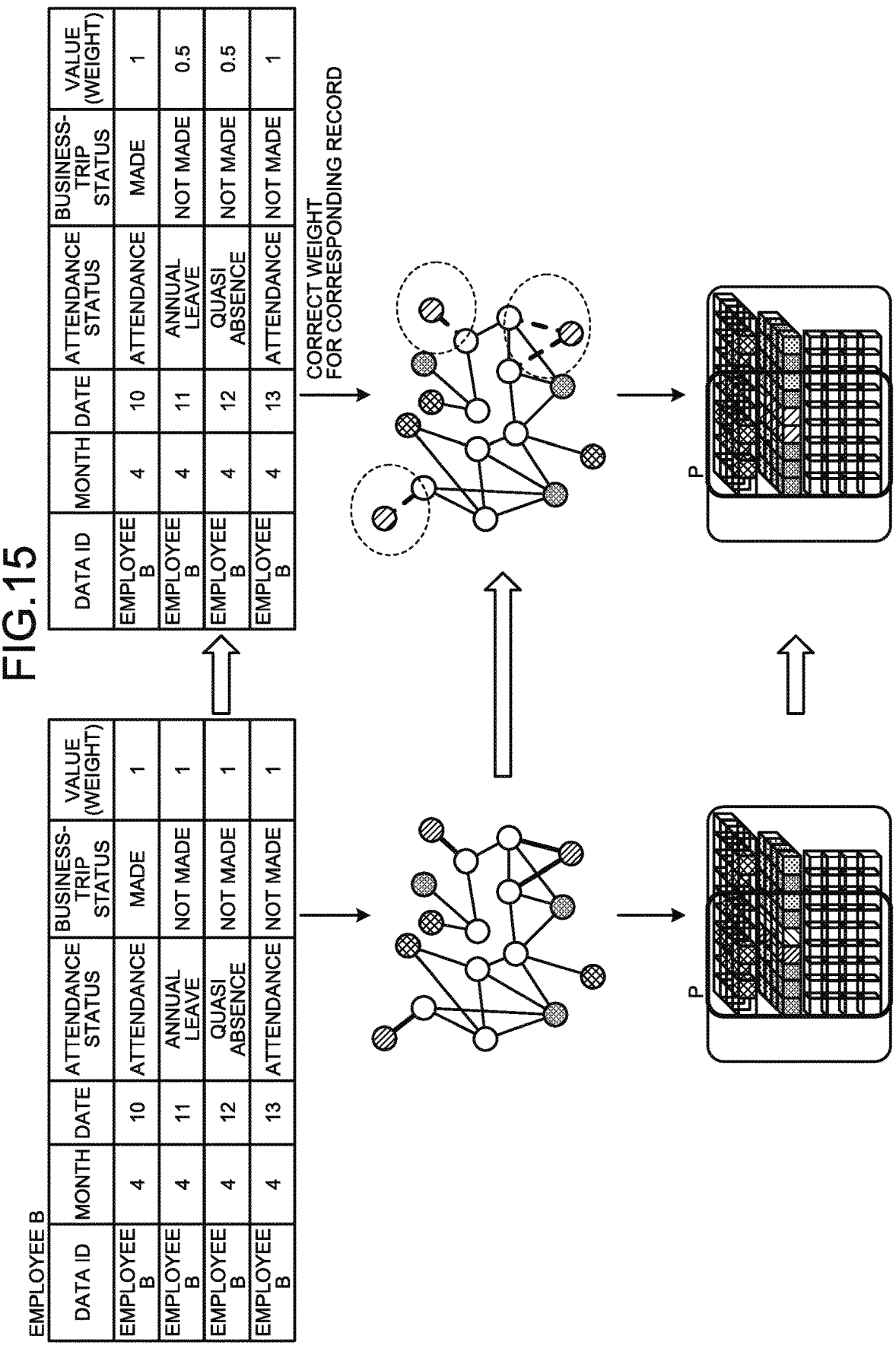
FIG. 15 is diagram explaining learning data on which weight change is performed.
Figure 16:
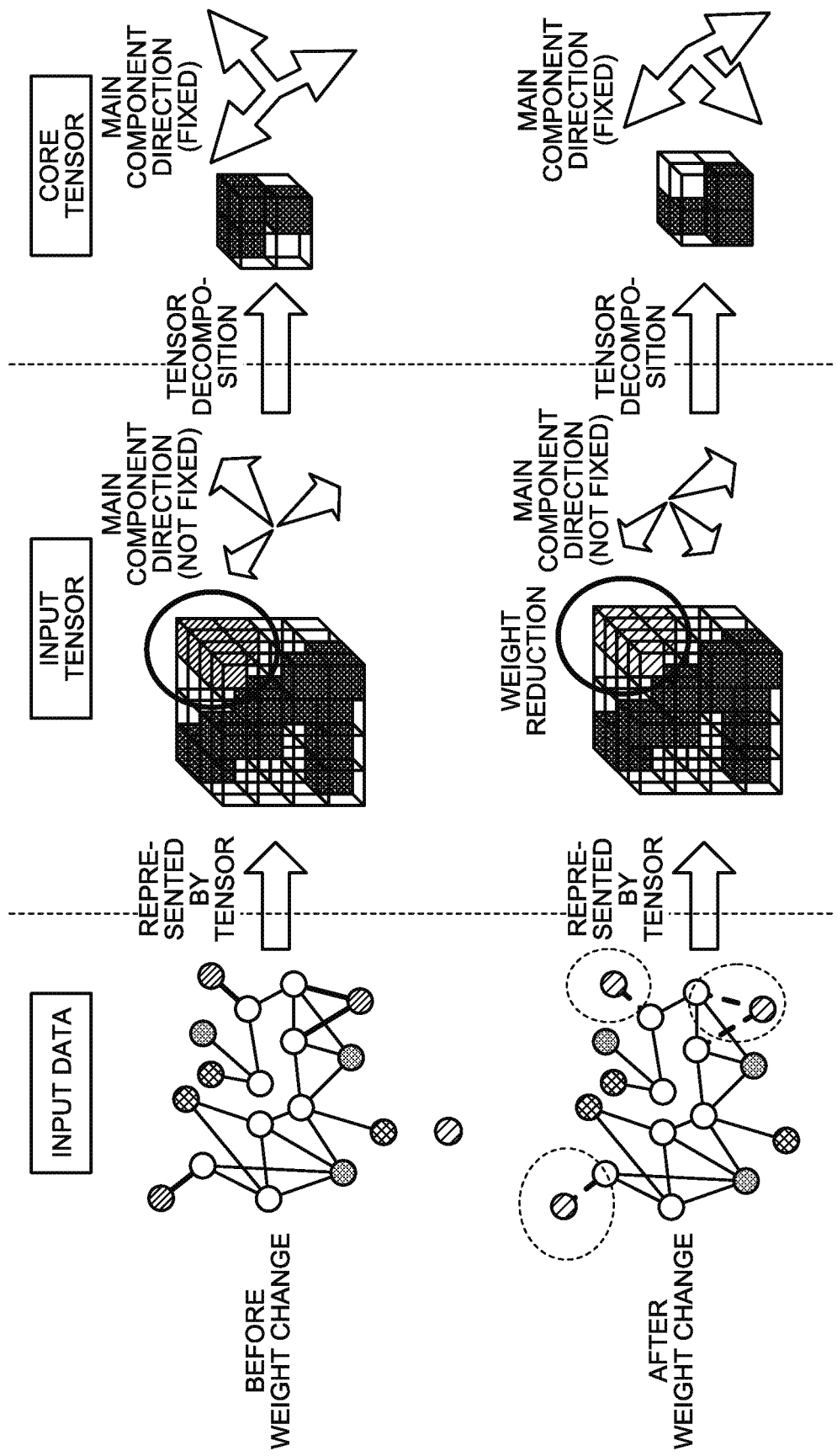
FIG. 16 is a diagram explaining influence of the weight change.

The following describes influence on learning of the NN due to changing the weight to 0.5 for the attendance book data about the treatment-experienced person after the medical treatment period with reference to FIGS. 12 to 16. FIG. 12 is a diagram illustrating an example of comparison of the pieces of tensor data. FIG. 13 is a diagram explaining weight change on the tensor data about the treatment-experienced person. FIG. 14 is a diagram explaining the learning data excluded from weight change. FIG. 15 is diagram explaining the learning data on which weight change is performed. FIG. 16 is a diagram explaining influence of the weight change.

In the following description, the attendance book data, which is attached with the label "medically treated", about employee A who is an unwell person, and the attendance book data, which is attached with the label "no medical treatment", about employee B who is the treatment-experienced person are exemplified. The attendance book data about employee B is that after the medical treatment period.

In the example in FIG. 6, for example, the weight is set to "0.5" for all of the elements in the attendance book data about the treatment-experienced person in the period after medical treatment. In the following example, the weight is changed for only one element. Among the date, the month, and the attendance status in the attendance book data, the weight for the attendance status is changed to 0.5 while the weights for the others are left unchanged as 1.0. The weight for which element is changed is set by the weighting rule.

As illustrated in FIG. 12, the tensor data produced from the attendance book data, which is attached with the label "medically treated", about employee A (unwell person), and the tensor data produced from the attendance book data, which is attached with the label "no medical treatment", about employee B (treated person) are different data when comparing them in a long time period such as one or two years. When paying attention to a short period P such as six months, they are the data similar to each other or the same data. Their features are, thus, not distinguished from each other. The data originally to be handled separately is handled as the data similar to each other because of having the same feature amount when the data is extracted for six months as the learning data. In the learning of the prediction model, such data is processed as the same case and the data about the treatment-experienced person becomes noise, causing deterioration in optimization of the target core tensor and accuracy deterioration in learning the NN. As a result, accuracy of a prediction model deteriorates.

As a countermeasure for the accuracy deterioration, as illustrated in FIG. 13, a part of weights for a tensor indicating the data about the treatment-experienced person (employee B) after being medically treated, which may include partially similar data, is changed by the weight setting by the weight setting unit 113 when the core tensor is formed (a partial pattern is extracted). For example, for the data about the treatment-experienced person having the medical treatment period, the values of the records falling under leave such as "annual leave" and "quasi absence, which includes tardiness and early leaving, for example" in the "attendance status" are set to "0.5" as a part of the weights for data period after medical treatment. The lengths of the edges and the values set to the nodes are changed.

The change of weights for data about the treatment-experienced person after the medical treatment period causes the edges in the graph structure to be changed, resulting in the tensor data being changed. As a result, the core tensor extracted from the attendance book data can be differentiated from the other one. The feature of the attendance book data about the treatment-experienced person in the period after medical treatment can be distinguished from the feature of the other attendance book data.

Specifically, as illustrated in FIG. 14, the learning device 100 sets the weight to "1.0" for all of the records in the attendance book data, which is attached with the label "medically treated", about employee A who is the unwell person although the attendance status includes leave such as annual leave. The attendance book data, thus, has a graph structure with data values left unchanged, and is represented as a tensor.

As illustrated in FIG. 15, the learning device 100 basically sets the weight to "1.0" for all of the records in the attendance book data, which is attached with the label "no medical treatment", about employee B. The weight is changed to "0.5" for the records (data) including annual leave and quasi absent in the attendance status. The shape of the graph structure representing the attendance book data differs from the shape of that when the weight is "1.0", the tensor data after being represented in a tensor also differs from that when the weight is "1.0".

The weight change, thus, allows different pieces of tensor data to be produced even when the pieces of attendance book data are similar to one another. Even when the pieces of attendance book data serving as the extraction sources of the core tensors are similar to one another, different pieces of tensor data can be produced from the respective pieces of data, thereby making it possible to learn the NN in accordance with the different features.

Specifically, as illustrated in FIG. 16, the shapes of the respective graph structures serving as the pieces of input data are changed before and after the weight change. The shapes of the respective input tensors (pieces of tensor data) that are produced from the pieces of input data and serve as the production sources of the core tensors are also changed. At this time, main component directions of the respective input tensors are not fixed, i.e., in an uncertain state, the main component directions, thus, also have a possibility of coinciding with each other before and after the weight change.

The tensor decomposition that extracts the core tensor from the input tensor is, then, performed, different core tensors are produced because the input tensors serving as the decomposition sources differ before and after the weight change. At this time, the main component direction of the core tensor representing the feature amount of the input tensor is fixed. The different core tensors having different main component directions are, thus, extracted before and after the weight change. Even when the pieces of attendance book data are similar to one another, the different core tensors can be extracted by the weight change. As a result, the reduction of the accuracy of the prediction model can be prevented even when the attendance book data about the treatment-experienced person in the period after medical treatment is used as the learning data.

Figure 17:
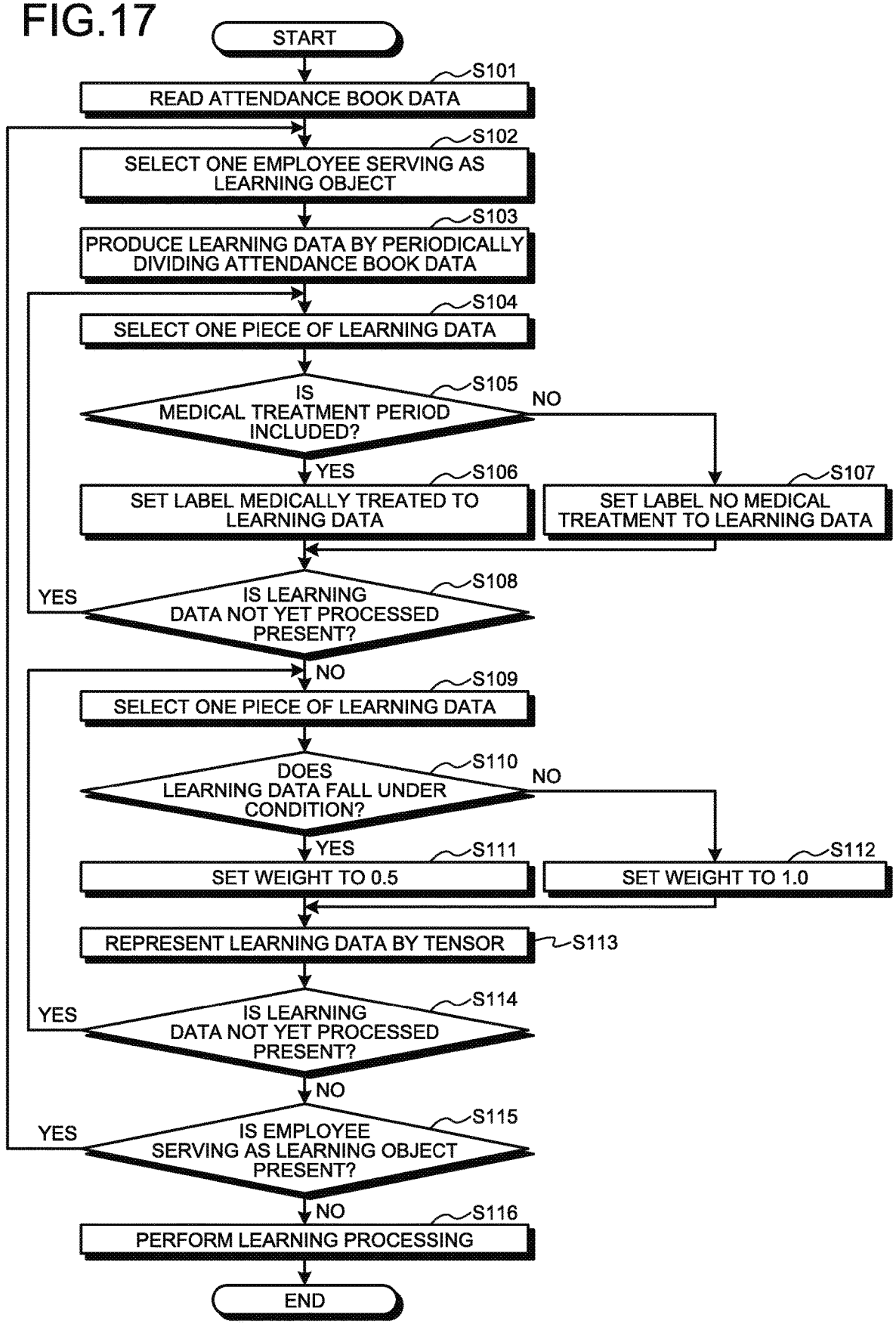
FIG. 17 is a flowchart illustrating a learning processing flow.

FIG. 17 is a flowchart illustrating a learning processing flow. As illustrated in FIG. 17, the learning data generation unit 111 reads the attendance book data from the attendance book data DB 104 (S101) and selects one employee serving as the learning object (S102).

The learning data generation unit 111 extracts pieces of data for six months from the attendance book data and attaches labels to respective pieces of extracted data on the basis of the presence or the absence of the medical treatment period in the attendance book data in the following three months, thereby producing the learning data (S103). When the medical treatment is included in the date for six months, the data is not employed as the learning data.

The learning data generation unit 111 selects one piece of the learning data (S104), refers to all of the pieces of attendance book data in the past about the employee corresponding to the learning data and determines whether the medical treatment period is included in the pieces of attendance book data (S105). If the medical treatment period is included (Yes at S105), the learning data generation unit 111 sets the label "medically treated" to the learning data (S106). If no medical treatment period is included (No at S105), the learning data generation unit 111 sets the label "no medical treatment" to the learning data (S107).

If the learning data not yet processed is present (Yes at S108), the processing from S104 onwards is repeated. If no learning data not yet processed is present (No at S108), the processing from S109 onwards is performed.

Specifically, the treatment-experienced person determination unit 112 selects one piece of learning data (S109) and determines whether the learning data falls under "a condition that the employee is the treatment-experienced person in a period after medical treatment" (S110). If the learning data falls under the condition (Yes at S110), the weight setting unit 113 changes the weight to "0.5" according to the weighting rule (S111). If the learning data doses not fall under the condition (No at S110), the weight setting unit 113 sets the weight to "1.0" without being changed (S112).

The tensor generation unit 114 represents the weighted learning data by a tensor to produce tensor data (S113). If the learning data not yet processed is present (Yes at S114), the processing after S109 onwards is repeated. If no learning data not yet processed is present (No at S114), the processing after S115 onwards is repeated.

Specifically, if the employee serving as the learning object is not yet processed is present (Yes at S115), the processing after S102 onwards is repeated. If the processing is completed for all of the employees (No at S115), the learning unit 115 performs the learning processing using the learning data (S116).

Figure 18:
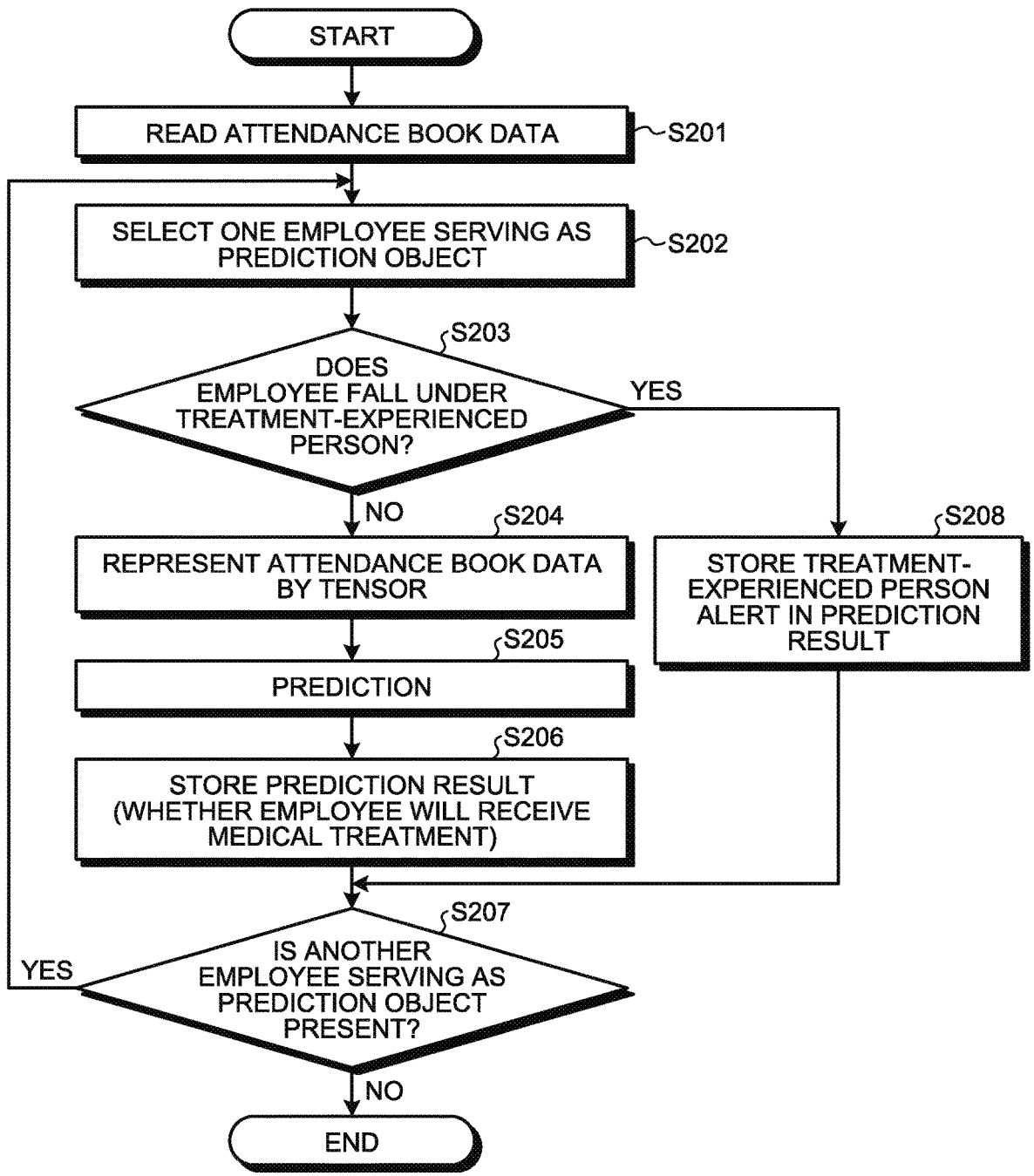
FIG. 18 is a flowchart illustrating a processing flow in prediction.

FIG. 18 is a flowchart illustrating a processing flow in prediction. As for the attendance book data to be predicted, the attendance book data for six months is used as input in the same manner as the learning. The prediction is, then, performed whether the employee will receive medical treatment in the following three months. As illustrated in FIG. 18, the prediction unit 116 reads the attendance book data from the prediction object DB 108 (S201), and selects one employee serving as the prediction object (S202).

The prediction unit 116 refers to the attendance book data about the employee to be predicted and determines whether the employee falls under the treatment-experienced person (S203).

If the employee does not fall under the treatment-experienced person (No at S203), the prediction unit 116 represents the attendance book data in a tensor (S204) and performs prediction using the learned prediction model (S205). The prediction unit 116, then, stores, in the storage unit 102, for example, the label of the prediction result that indicates whether the employee will receive medical treatment in the following three months (S206).

If another employee serving as the prediction object is present (Yes at S207), the processing after S202 onwards is performed. If no employee to be predicted is present (No at S207), the processing ends. If the employee falls under the treatment-experienced person at S203 (Yes at S203), the prediction unit 116 stores a treatment-experienced person alert indicating that the employee is the treatment-experienced person in the prediction result (S208). The determination of the employee falling under the treatment-experienced person at S203 includes a case where the employee is excluded from the prediction object when the medical treatment is included in the attendance book data to be predicted (data for six months) in addition to a case where the employee is the treatment-experienced person who had the medical treatment in the attendance book data in a period before the period of the attendance book data (for six months) to be predicted.

As described above, in learning of the feature of an unwell person, accuracy of the prediction model is reduced because the attendance book data about the unwell person and the attendance book data about the treatment-experienced person in a period after medical treatment are similar to each other and the learning, thus, includes noise. The learning device 100 according to the first embodiment can change the graph structure of the attendance book data by changing the weight for the attendance book data about the treatment-experienced person in a period after medical treatment, thereby making it possible to differentiate the core tensors input to the NN from each other.

Specifically, the learning device 100 sets the weight to "1.0" for the learning data (the label: no medical treatment) falling under a well person, the learning data falling under the unwell person (medically treated), and the learning data (label: medically treated) falling under the treatment-experienced person in the period before medical treatment in accordance with the weighting rule. The learning device 100 changes the weight to "0.5" for the learning date falling under the treatment-experienced person in the period after medical treatment (label: medically treated).

The learning device 100 can clearly differentiate the feature amounts (core tensors) of the respective pieces of learning data from one another as described above. The learning device 100, thus, can effectively utilize the characteristic of "the deep tensor is capable of extracting a partial structure (partial pattern of the tensor) contributing to the prediction as the core tensor", thereby making it possible to accurately perform prediction using a small amount of learning data.

The first embodiment of the invention is described above. The invention may be implemented by various different embodiments other than the first embodiment.

The learning processing described above can be performed any number of times. For example, the learning processing can be performed using all of the pieces of learning data. For another example, the learning processing can be performed a certain number of times. As for the calculation method of the classification error, known calculation methods such as a least-squares method can be employed and general calculation methods used for the NN can also be employed. The learning data and the attendance book data can be acquired from external devices.

In the first embodiment, the weight is set to "0.5" for the learning data falling under the treatment-experienced person in the period after medical treatment and the weight is set to "1.0" for other learning data. The weights are not limited to being set to these examples. Specifically, a method can be employed that can change a behavior of leave of the treatment-experienced person in a period after medical treatment to a different behavior from that of a new unwell person.

For example, the learning device 100 changes the weight to a value smaller than 1 for the attendance status uniformly regardless of the types of leave. For a specific example, the learning device 100 uses the monthly average number of leave days in a learning period (six months) before weight change as Da and the monthly average number of leave days in a period sufficiently longer than the learning period (e.g., one year) as Db. The learning device 100 uses Db/Da as a correction value of the weight for the learning data falling under the treatment-experienced person in the period after medical treatment. Normally, it is predicted that Da>Db. A pattern of the number of leave days of the learning data falling under the treatment-experienced person in the period after medical treatment can be close to the original pattern of the number of leave days of the treatment-experienced person.

The learning device 100 calculates the monthly average number of leave days Dc of the well person and uses Dc/Da as a correction value of the weight for the learning data falling under the treatment-experienced person in the period after medical treatment. This allows the behavior of the treatment-experienced person to be close to that of the well person. The learning device 100 can set the weight to a very small value such as 0.1 for the learning data falling under the treatment-experienced person in the period after medical treatment so as to be hardly influenced by a leave condition and to reliably distinguish the treatment-experienced person from a person who will newly take administrative leave. The learning device 100 can change the weight to a value smaller than 0.5 for the quasi absent in the types of leave such as annual leave and quasi absence.

The learning device 100 can replace the attendance book data about the treatment-experienced person in the period after medical treatment with the attendance book data of a well person to produce the learning data. The learning device 100 can replace the learning data about the treatment-experienced person in the period after medical treatment with the learning data about a well person.

In the first embodiment, the weight is changed for the learning data falling under the treatment-experienced person in the period after medical treatment. The weight change object is not limited to this example. The weight can also be set to "0.5" for the learning data about the treatment-experienced person regardless of before and after the medical treatment period. In the first embodiment, the weight is changed to "0.5" for the attendance status out of the elements of the attendance book data and the weight is left unchanged as 1.0 for the other elements (e.g., month). The elements for which the weights are changed are not limited to the example. The elements for which the weights are changed can be arbitrarily changed.

In the first embodiment, the weight is changed for the tensor data about the treatment-experienced person who has a past experience of receiving medical treatment. The condition to change the weight is not limited to the example. For example, an employee who cares children or family members is an object for which the weight is changed. Data about such an employee who has fluctuation in work not caused by the poor physical condition can also become noise in prediction of an employee who will newly receive medical treatment. In this way, the condition to change the weight for the tensor data can be arbitrarily changed.

In the first embodiment, the data for six months or three months is automatically extracted from the attendance book data and the label "medically treated" or "no medical treatment" is attached to the data in the learning. The learning is not limited to this manner in the first embodiment. For example, when the data for a predetermined period and the commented label are provided from a user, the given data and label can also be used.

The setting of the labels are only examples and not limited to those of medically treated and no medical treatment. Various labels that can distinguish between the presence and the absence of the unwell person can be used such as labels of an unwell person and a well person, and labels of the presence and the absence of administrative leave. The values described in the embodiments are only examples. The values can be arbitrarily changed.

The attendance book data for six months is used as the data for prediction. The period of the attendance book data is not limited to six months. The period can be changed to any period such as four months. The label is attached to the attendance book data for six months on the basis whether the medical treatment is received in the following three months. The period is not limited to three months. The period can be changed to any period such as two months. In the first embodiment, the learning device 100 represents the attendance book data by a tensor. The data represented by a tensor by other devices can be acquired and the various types of processing described above can be performed. In the first embodiment, the description is made, as an example, on the basis of the third rank tensor for simple explanation although the tensor is actually the fourth rank tensor. The rank can be arbitrarily changed. The number of orders can also be arbitrarily changed.

In the first embodiment, the prediction is made whether the employee will receive medical treatment by learning the attendance book data. The prediction is not limited to this example. For example, the prediction can be applied to a failure prediction using operating data about electronic parts, an attack prediction using communication data, and a traffic congestion prediction using traffic volume data about roads.

In the second embodiment, various neural networks such as a recurrent neural network (RNN) and a convolution neural network (CNN) can be used. As for the learning technique, known various techniques can be employed in addition to the backpropagation. The neural network has a multiple stage structure composed of an input layer, an intermediate layer (hidden layer), and an output layer, for example. Each layer has a structure in which a plurality of nodes are linked by the edges. Each layer has a function called an "activation function". Each edge has a "weight". The value of each node is calculated from a value of the node in the previous layer, a value of the weight for the connection edge (weight coefficient), and the activation function of the layer. As for the calculation method, various known methods can be used.

Learning in the neural network is to correct parameters, i.e., weights and biases so as to cause the output layer to have a correct value. In the backpropagation, a "loss function" that indicates how far the value of the output layer is from a correct state (desired state) is defined and the weights and biases are updated so as to minimize the loss function using a steepest descent method, for example.

The processing procedures, control procedures, specific names, information including various types of data, and parameters that are described and illustrated in the specification and the accompanying drawings can be arbitrary modified unless otherwise described. The specific examples, distributions, and values described in the embodiments are merely examples. They can be arbitrarily changed.

The respective constituent elements of the respective devices illustrated in the accompanying drawings are functionally conceptual and need not to be physically structured as illustrated. The specific forms of distribution and integration of the respective devices are not limited to those illustrated. The whole or a part of the respective devices can be structured by being functionally or physically distributed or integrated on the basis of any unit in accordance with the various loads and usage conditions. All or a part of the respective processing functions performed by the respective devices are achieved by the CPU and a program that is analyzed and executed by the CPU, or can be achieved as hardware by wired logic.

Figure 19:
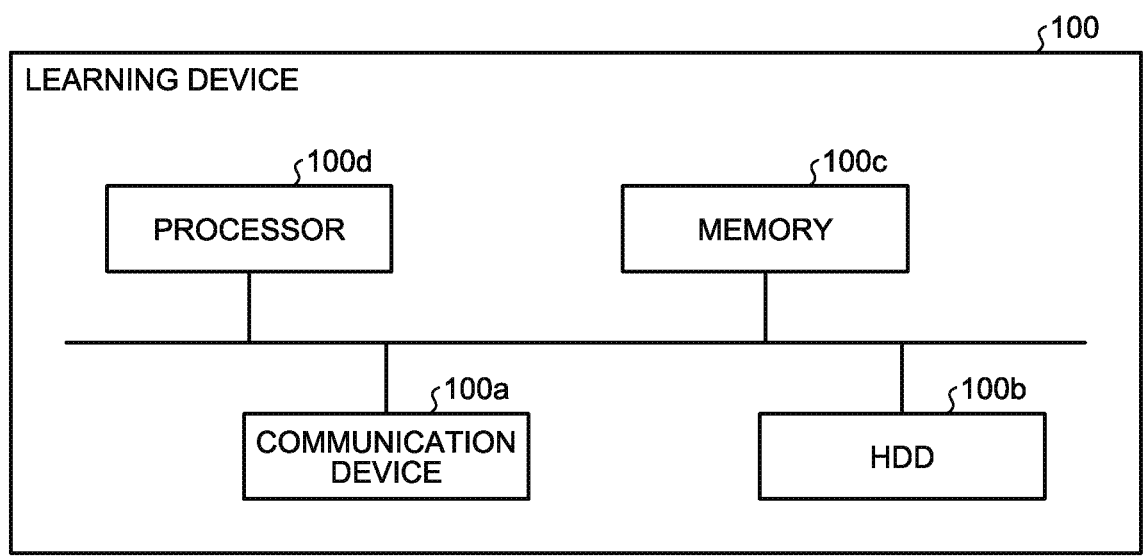
FIG. 19 is a diagram illustrating an exemplary hardware structure.

FIG. 19 is a diagram illustrating an exemplary hardware structure. As illustrated in FIG. 19, the learning device 100 includes a communication device 100a, a hard disk drive (HDD) 100b, a memory 100c, and a processor 100d. The respective components illustrated in FIG. 19 are mutually coupled with a bus, for example.

The communication device 100a, which is a network interface card, for example, communicates with other servers. The HDD 100b stores therein a program that causes the functions illustrated in FIG. 6 to operate and the databases (DBs) illustrated in FIG. 6.

The processor 100d reads a program that executes the same functions as the respective processing units illustrated in FIG. 6 from the HDD 100b, for example, develops the program on the memory 100c to operate the processing to perform various functions described with reference to FIG. 6, for example. This processing performs the same functions as the respective processing units included in the learning device 100. Specifically, the processor 100d reads, from the HDD 100b, for example, a program having the same functions as the learning data generation unit 111, the treatment-experienced person determination unit 112, the weight setting unit 113, the tensor generation unit 114, the learning unit 115, the prediction unit 116, and the like. The processor 100d executes processing that performs the same processing as the learning data generation unit 111, the treatment-experienced person determination unit 112, the weight setting unit 113, the tensor generation unit 114, the learning unit 115, the prediction unit 116, and the like.

The learning device 100 operates as an information processing device that reads the program and executes the program to perform the learning method. The learning device 100 can read the program from a recording medium by a medium reading device and execute the read program to achieve the same functions as the first embodiment. The program described in the second embodiment is not limited to being executed by the learning device 100. For example, the invention can be applied to a case where other computers or servers execute the program or the computers and the servers cooperate to execute the program.

The program can be distributed via a network such as the Internet. The program can be recorded in a computer readable recording medium such as a hard disk, a flexible disk (FD), a compact disc (CD)-read only memory (ROM), a magneto-optical disk (MO), or a digital versatile disc (DVD) and executed by a computer reading the program from the recording medium.

The embodiment has an advantageous effect of capable of preventing reduction in prediction accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A machine learning method comprising:
    acquiring data including attendance records of employees and information indicating which employee has taken a leave of absence from work;
    in response to determining that a first employee of the employees has not taken a leave of absence in accordance with the data, generating a first tensor on a basis of an attendance record of the first employee and parameters for generating tensors, the parameters being associated with elements that are associated with any of a date, a month, and attendance status included in the attendance record;
    in response to determining that a second employee of the employees has taken a leave of absence in accordance with the data, modifying the parameters, and generating a second tensor on a basis of an attendance record of the second employee and the modified parameters; and
    training a machine learning model based on the first tensor and the second tensor, wherein the training of the machine learning model includes:
        generating a first core tensor based on the first tensor and a second core tensor based on the second tensor, and
        training the machine learning model based on the first core tensor and the second core tensor, wherein the generating of the second tensor includes:

referring to a weighting rule for a treatment-experienced person who has a past experience of receiving medical treatment and has been reinstated, modifying the parameters of the elements associated with any of a date, a month, and attendance status included in the attendance records in the data of the treatment-experienced person among in the data of the second employee, and leaving the parameters of the elements unchanged for the data of the second employee excluding the treatment-experienced person.

2. The machine learning method according to claim 1, wherein the trained machine learning model is a neural network configured to output a value indicating a possibility that a third employee takes a leave of absence in response to receiving an attendance record of the third employee.

3. The machine learning method according to claim 1, wherein the data is formed as graph data including a plurality of nodes associated with the elements in the tensor and a plurality of edges connecting the nodes, the nodes are composed of date nodes, month nodes, and attendance status nodes, the date nodes, the month nodes, and the attendance status nodes are present corresponding to the numbers of dates, months, and types of the attendance status, respectively, in each of the nodes, a value corresponding to one of the dates, the months, and the types of the attendance status is stored, each of the edges connects related nodes among the date nodes, the month nodes, and the attendance status nodes, wherein, the generating of the second tensor includes, for the second employee excluding the treatment-experienced person, generating the second tensor indicating the graph data in which the values stored in the nodes are not modified, and generating a third core tensor from the tensor data so as to be similar to a target core tensor, the generating of the second tensor includes, for the treatment-experienced person, generating a treatment-experienced tensor indicating the graph data in which the values are modified on the basis of the modified parameters, and generating a fourth core tensor from the treatment-experienced tensor so as to be similar to the target core tensor, and the training of the machine learning model includes learning a relation between nodes and edges that indicate a feature of the employee who has no experience of receiving medical treatment based on the third core tensor, and learning a relation between nodes and edges that indicate a feature of the treatment-experienced person based on the fourth core tensor.

4. The machine learning method according to claim 3, wherein the weighting rule is information that modifies a value of the node or a length of the edge in a graph structure of the data before and after the modifying the parameters so as to change a shape of the graph structure.

5. The machine learning method according to claim 1, wherein the training of the machine learning model includes modifying the parameters of elements included in the treatment-experienced tensor, the treatment-experienced tensor being similar to the second tensor, to differentiate between a main component direction of the second core tensor generated from the second tensor by tensor decomposition and a main component direction of the fourth core tensor generated from the treatment-experienced tensor, and learning a feature amount of the second employee and a feature amount of the treatment-experienced person.

6. A non-transitory computer-readable recording medium storing therein a machine learning program that causes a computer to execute a process comprising:

acquiring data including attendance records of employees and information indicating which employee has taken a leave of absence from work;

in response to determining that a first employee of the employees has not taken a leave of absence in accordance with the data, generating a first tensor on a basis of an attendance record of the first employee and parameters for generating tensors, the parameters being associated with elements that are associated with any of a date, a month, and attendance status included in the attendance record;

in response to determining that a second employee of the employees has taken a leave of absence in accordance with the data, modifying the parameters, and generating a second tensor on a basis of an attendance record of the second employee and the modified parameters; and training a machine learning model by using the first tensor and the second tensor, wherein the training of the machine learning model includes:

generating a first core tensor based on the first tensor and a second core tensor based on the second tensor, and training the machine learning model based on the first core tensor and the second core tensor, wherein the generating of the second tensor includes:

referring to a weighting rule for a treatment-experienced person who has a past experience of receiving medical treatment and has been reinstated, modifying the parameters of the elements associated with any of a date, a month, and attendance status included in the attendance records in the data of the treatment-experienced person among in the data of the second employee, and leaving the parameters of the elements unchanged for the data of the second employee excluding the treatment-experienced person.

7. The non-transitory computer-readable recording medium according to claim 6, wherein the trained machine learning model is a neural network configured to output a value indicating a possibility that a third employee takes a leave of absence in response to receiving an attendance record of the third employee.

8. The non-transitory computer-readable recording medium according to claim 6, wherein the data is formed as graph data including a plurality of nodes associated with the elements in the tensor and a plurality of edges connecting the nodes, the nodes are composed of date nodes, month nodes, and attendance status nodes, the date nodes, the month nodes, and the attendance status nodes are present corresponding to the numbers of dates, months, and types of the attendance status, respectively, in each of the nodes, a value corresponding to one of the dates, the months, and the types of the attendance status is stored, each of the edges connects related nodes among the date nodes, the month nodes, and the attendance status nodes, wherein, the generating of the second tensor includes, for the second employee excluding the treatment-experienced person, generating the second tensor indicating the graph data in which the values stored in the nodes are not modified, and generating a third core tensor from the tensor data so as to be similar to a target core tensor, the generating of the second tensor includes, for the treatment-experienced person, generating a treatment-experienced tensor indicating the graph data in which the values are modified on the basis of the modified parameters, and generating a fourth core tensor from the treatment-experienced tensor so as to be similar to the target core tensor, and the training of the machine learning model includes learning a relation between nodes and edges that indicate a feature of the employee who has no experience of receiving medical treatment based on the third core tensor, and learning a relation between nodes and edges that indicate a feature of the treatment-experienced person based on the fourth core tensor.

9. The non-transitory computer-readable recording medium according to claim 8, wherein the weighting rule is information that modifies a value of the node or a length of the edge in a graph structure of the data before and after the modifying the parameters so as to change a shape of the graph structure.

10. The non-transitory computer-readable recording medium according to claim 6, wherein the training of the machine learning model includes modifying the parameters of elements included in the treatment-experienced tensor, the treatment-experienced tensor being similar to the second tensor, to differentiate between a main component direction of the second core tensor generated from the second tensor by tensor decomposition and a main component direction of the fourth core tensor generated from the treatment-experienced tensor, and learning a feature amount of the second employee and a feature amount of the treatment-experienced person.

\* \* \* \* \*